United States Patent Office 3,426,096
Patented Feb. 4, 1969

3,426,096
POLYMERIC MATERIAL SOLUBLE IN ORGANIC SOLVENT AND BASED ON THE REACTION PRODUCT OF BORIC ACID WITH A LACTAM
Bryce P. Anderson, Berkeley, Calif., assignor to De Soto Chemical Coatings, Inc., Chicago, Ill., a corporation of Delaware
No Drawing. Filed May 13, 1964, Ser. No. 367,241
U.S. Cl. 260—830       9 Claims
Int. Cl. C08g 49/00; C07d 109/00

ABSTRACT OF THE DISCLOSURE

Boric acid is reacted at moderate temperature with a lactam to form an addition product, the boric acid functioning as a trihydric compound in the reaction to combine with 1, 2 or 3 molecules of lactam depending on the molar ratio used. These addition products can be condensed to form organic solvent-soluble resinous polymers either alone or in the presence of additional lactam. These polymers are reactive and can be cross-linked by anhydride formation, imide formation, or with added reactive materials such as polyhydric alcohols, epoxy functional materials, primary diamines, amino alcohols, hydroxy acids and their anhydrides, divalent or polyvalent inorganic salts or polyisocyanate and the like. The polymers of the invention are also useful together with other resinous materials in the formation of ablation coating materials, such other resins being illustrated by epoxy resins.

---

The present invention relates to reaction products of boric acid with lactams and to heat resistant polymers produced therefrom. The invention particularly contemplates organic solvent-soluble polymeric materials based on reaction products of boric acid and lactams which can be applied to a substrate by coating and baked to produce adherent polymeric coatings possessing the capacity of resisting extreme temperatures in the range of up to about 5700° F. for substantial periods of time, whereby important utility is obtained in the fields of rocket engines and missile surfaces. Also, the invention includes ablation materials comprising a compatible mixture of relatively easily volatile resin and high temperature-resistant resin which is applied from organic solvent solution to form films and coatings of relatively homogeneous resinous materials in which the easily volatile resin is eliminated by heat from a high temperature-resistant inorganic resinous matrix which maintains its physical integrity as the easily volatile material is removed whereby the temperature of the composite is prevented from exceeding the temperature of volatilization of the easily volatile resin until the easily volatile resin is gone.

In accordance with the invention, the reaction of boric acid with a lactam provides various materials, particularly where varying molar proportions of the reactants are used. The thus provided materials are useful as intermediates in the formation of polymeric materials exhibiting high heat resistance along the lines mentioned hereinbefore.

In accordance with the invention, it has been found that boric acid ($H_3BO_3$) will react with a lactam

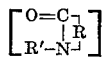

in an addition reaction as follows:

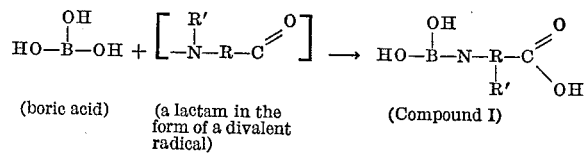

wherein R is a divalent aliphatic radical of at least 2 carbon atoms, preferably an alkylene radical, and R' is a member selected from the group consisting of hydrogen, aliphatic radicals (preferably alkyl), and aryl radicals. In the preferred embodiment of the invention, R' is hydrogen.

It has further been found that Compound I is capable of reacting with additional lactam to yield the following products:

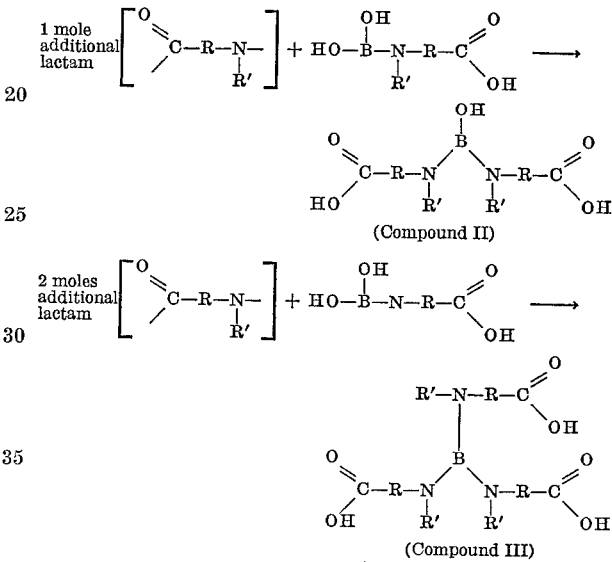

Compound II can also be prepared directly by reacting two moles of a lactam with one mole boric acid to obtain the same resultant product. Similarly, Compound III can be prepared by reacting three moles of a lactam with one mole of boric acid and also by reacting one mole of lactam with one mole of Compound II.

The mole ratio of lactam to boric acid is preferably in the range of from 0.7 mole of lactam per mole of boric acid to 3.0 moles of lactam per mole of boric acid. Through the reaction may proceed at a mole ratio of lactam to boric acid of less than 0.7 to 1, materials having the desired polymeric character are produced at or above this ratio. Excesses of lactam above 3.0 moles of lactam per mole of boric acid are surplusage from the standpoint of the boric acid as a trifunctional materials. However, and as will be later more fully discussed, the presence of excess lactam is of value in converting the monomeric components which have been discussed as well as cyclic derivatives thereof, to be later discussed, into polymeric form.

Lactams, which comprise a small class of organic compounds, are cyclic amide anhydrides of monoamino-monocarboxylic acids corresponding to the following formula:

wherein R is a divalent aliphatic radical of at least 2 carbon atoms, and R' is a member selected from the group consisting of hydrogen, aliphatic radicals (preferably alkyl) and aryl radicals. R is preferably alkylene and R' is preferably hydrogen.

Illustrative lactams which may be used in accordance with the invention are the following:

(A) Unsubstituted lactams (1) epsilon-caprolactam
(2) zeta-heptanoic acid lactam
(3) eta-octanoic acid lactam
(4) lauric lactam
(5) oenanthic lactam
(6) ortho-palmitilactam (B) Branched and substituted lactams (1) methyl-2-cyclohexanoneisoxime
(2) N-methyl oenanthic lactam
(3) N-ethyl oenanthic lactam
(4) N-methyl caprolactam
(5) N-ethyl caprolactam
(6) N-methyl lauric lactam
(7) N-ethyl lauric lactam
(8) N-vinyl caprolactam
(9) N-allyl caprolactam
(10) N-crotyl caprolactam
(11) N-methallyl caprolactam
(12) N-hexene-(4)-yl caprolactam It is to be understood that the foregoing lactams may also be substituted with the following radicals in place of those named: propyl, butyl, isobutyl, isoamyl, hexyl, etc.

Compounds which yield lactams in free radical form are also contemplated such as glycine anhydride (diketopiperazine).

Boric acid is an inorganic acid and while its formula is generally given as $H_3BO_3$, it is not usually considered to react as a polybasic acid because, upon heating it to relatively low temperatures, it easily gives up one mole of water and thereafter reacts according to the general formula for metaboric acid ($HBO_2$). Its reactions in aqueous solutions have been frequently shown by physical chemical measurements to indicate the formula $HBO_2$ rather than $H_3BO_3$. The organic esters of boric acid indicate an acid of composition $HBO_2$ rather than $H_3BO_3$. All chemical information indicates that boric acid ($H_3BO_3$) is really a hydrate of the acid $HBO_2$ and is to be looked upon as $HBO_2$—$H_2O$.

In contrast, the invention relies upon the use of boric acid as a trihydric material. The reaction of lactam with boric acid ties up at least one of the boron OH groups, thereby thwarting the decomposition or dehydration reaction suggested by the art and allowing the boric acid to remain as a trihydric material which is essential to the invention. It is believed that this new result is due to the cyclic anhydride structure of the lactam which opens upon appropriate activation, e.g., by heating or by ultraviolet light exposure to form the divalent radical:

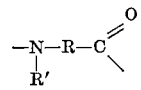

It would appear that the divalent free radical form of the lactam is capable of a simple addition reaction with boric acid, possibly in accordance with the molecular rearrangement shown below:

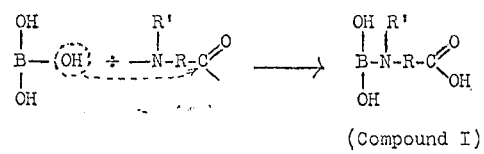

(Compound I)

Compound I is far more resistant to heat decomposition than is boric acid.

Analysing the addition reaction by first reacting three moles of lactam with one mole of boric acid, it is noticed that no water is given off. If boric acid dehydration had occurred, one would expect to produce one mole of water or, contemplating the reaction of one of three moles of lactam with monofunctional metaboric acid (HOB=O), one would still expect that water would be generated, and this does not occur.

If two moles of lactam are reacted with one mole of boric acid, one again notices that no water is evolved, even when temperatures are reached where boric acid would normally start to dehydrate. If the addition reaction did not take place, one might expect to find two moles of water released with the production of a product along the lines of the structure shown below:

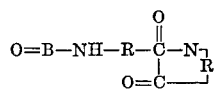

having only one weakly active group.

If the addition reaction did not take place in the reaction and one mole of lactam reacted with one mole of boric acid, one might expect two moles of water, the product speculatively being:

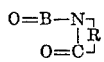

which has no reactive groups.

In contrast, Compound I of the invention is strongly reactive and the addition reaction noted hereinbefore appears to be the one which takes place.

Thus, the reaction proceeds so as to tie up the boric acid in its trihydric form substantially without formation of the monohydric metaboric acid.

The foregoing products, i.e., Compounds I–III, are preferably formed by reaction at a temperature sufficient to cause the reaction and below the decomposition temperature of the boric acid. The use of temperatures below the decomposition temperature of boric acid is not viewed as essential since, as soon as any of Compounds I, II and III are formed, they are resistant to thermal decomposition. Further, any method of reaction may be used which allows the boric acid to contact the lactam in its divalent free radical form so that the lactam has an opportunity to tie up the boric acid in an addition reaction which, as noted before, thwarts the decomposition reaction of boric acid.

The reaction is effected in the liquid phase at temperatures above room temperature, the reaction being more rapid with increasing temperature. Ultraviolet light, while not necessary, may be used to facilitate the generation of the lactam free radicals.

In accordance with the invention, Compounds I, II and III, which are addition products, can be reacted with themselves or each other to form resinous polymeric materials. The reaction of these materials is through the mechanism of condensation, the residual boron OH group condensing with the R' group of the lactam and splitting out R'OH to form a boron to nitrogen bond. This reaction is facilitated when R' is hydrogen, water being the product of condensation. The resinous condensation products have repeating units having the formula:

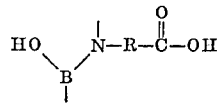

In the invention, Compounds I and II have been found to be stable and reactive with themselves, one another, and with Compound III. In contrast with the reactions forming Compounds I, II and III, which are addition reactions, involving a divalent radical and which will proceed at a temperature below the decomposition temperature of boric acid, the reaction of the boron OH group with the secondary amine group does not proceed at such a convenient temperature in the absence of extraneous catalyst. Illustrative of the condensation reaction wherein three molecules of Compound I are condensed (R' being hydrogen) is as follows:

Similarly, since both Compounds I and II possess reactive boron OH and secondary amino hydrogen atoms, these compounds may also be condensed together to form polymeric materials having the desired boron to nitrogen linkage providing the increased heat resistance desired.

Compounds IV and V are reactive with additional lactam to form further useful polymeric materials. Compounds IV and V each possess unreacted boron OH groups

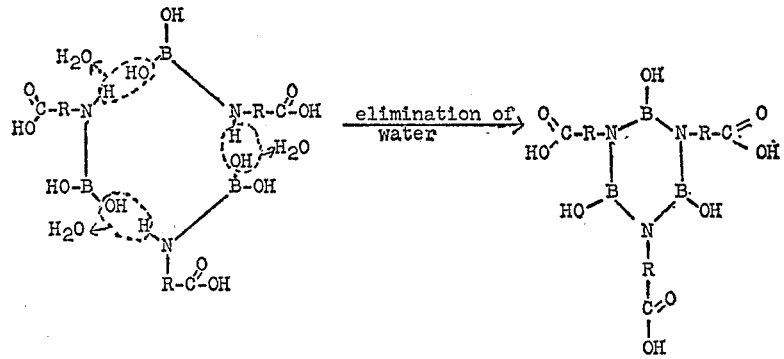

(Compound IV)

Compound II can also homopolymerize by condensation according to the following reaction:

which are reactable with a lactam as discussed hereinbefore. The lactam operates as a cross-linking agent be-

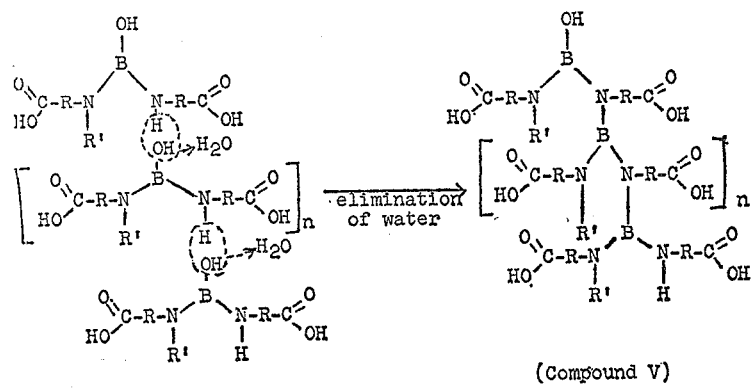

(Compound V)

Compound III does not homopolymerize by condensation to form materials which possess a high degree of heat resistance since Compound III contains no boron OH groups to form the boron to nitrogen linkage which apparently is the basis for the high heat resistance obtained. However, Compound III does possess carboxyl functionality which can react with the secondary amino hydrogen atom of another molecule of Compound III to form an amide cross linkage.

While Compound III does not enter into a homopolymerization reaction, polymeric materials having the desired boron to nitrogen linkage can be formed by reacting Compound III with Compound I, Compound II or both, since Compounds I and II carry boron OH groups which are reactable with the secondary amino hydrogen atoms of Compound III. The polymeric materials formed by reacting Compounds I, II and III contain these compounds in a random orientation largely determined by stoichiometry and reaction conditions.

tween two molecules of Compound V since Compound V contains only one boron OH group per molecule.

As a particularly preferred feature of the invention, Compound IV can be formed into a long chain polymeric materials by reaction with further lactam to provide a material having alternating Compound IV groups and amino carboxylic acid groups.

Taking

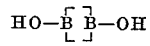

as representing Compound IV, the reaction with a lactam may be illustrated as follows:

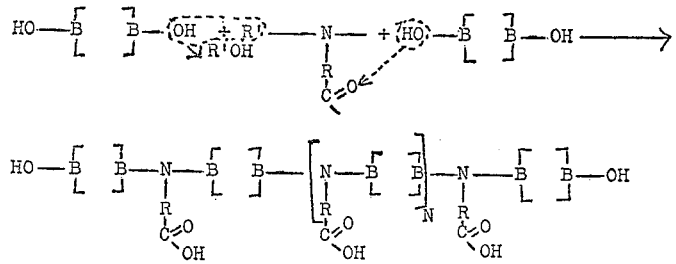

(Compound VI)

Thus, and as is illustrated by the formula of Compound VI, the cyclic structure of Compound IV may be polymerized to form polymers by reaction with additional lactam. To provide polymers of reasonable chain length, at least 1 mol of lactam and less than 3 mols of lactam are employed per mol of Compound IV. Greater chain length is obtained at intermediate molar ratios. When the molar ratio is outside of these molar limits, the reaction products tend to be monomeric. Of course, the formulas shown above are diagrammatic since Compound IV contains 3 boron OH groups providing an opportunity for extensive cross-linking some of which may be present in organic solvent soluble polymers, and additional lactam may be used to provide a cross-linking cure or other mechanisms utilized as will be discussed.

These polymer structures may include association bonds between the carbonyl oxygen of the lactam residues and the boron atoms in the polymer molecule.

Compounds IV, V and VI are capable of reaction with each other and with Compounds I, II and III to form randomly ordered polymeric materials, the numbers of each largely determined by stoichiometry and reaction conditions.

It should be observed that the polymers which are formed contain numerous

groups providing extensive solubility in organic solvents and it is this feature which permits the solvent application of essentially inorganic resins having exceptional resistance to heat.

Various organic solvents have been found to be useful in dissolving the resins of the present invention, and these may be illustrated as follows: ether type solvents such as 2-butoxy ethanol and 2-ethoxy ethanol; alcohol type solvents such as ethanol, butanol, ethylene glycol, and glycerine; and ketone type solvents such as methyl ethyl ketone.

It should also be noted that Compounds I–VI contain not only numerous carboxyl groups

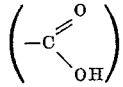

but also secondary amino hydrogen atoms. Both of these functional groups can be used to form various heat resistant polymeric materials. Also, these functional groups provide areas of possible cross-linking curing reactions in the sense of enhancing the physical and chemical properties of films or coatings resistant to solvent attack, such as anhydride formation, imide formation, or by reaction with added reactive groups which may also include inorganic materials.

Various polymeric materials, especially film and coating materials having heat resistant properties, may be prepared by reacting the carboxyl groups of compounds I–VI with a di- or poly-functional material capable of reaction with the carboxyl group. Illustrative of such a reaction would be the polyesterification reaction of one or more of Compounds I–VI with a glycol such as ethylene glycol under the usual esterification conditions of temperature and reaction time to form a polyester having superior heat resistant properties. Various other components may be included in the esterification reaction such as as a difunctional acid (phthalic acid) and trihydric material (glycerin) as is well known in the formation of polyesters.

Various other materials which may be used to form polymeric materials and/or cross-link the same by reaction with the carboxylic materials of the invention may be illustrated as follows:

(A) Polyhydric alcohols
(1) ethylene glycol, propylene glycol, butylene glycol, etc.
(2) glycerol, pentaerythritol
(3) any other polyhydric alcohol may also be used in accordance with the invention.

(B) Epoxy functional materials
(1) ethylene oxide, propylene oxide, butylene oxide
(2) epichlorohydrin
(3) reaction products of epichlorohydrin and 2,2'-bis-(p-hydroxyphenylpropane) having a molecular weight in the range of from 390–6700
(4) glycidyl acrylates and methacrylates (C) Primary diamines
(1) ethylene diamine (D) Amino alcohols
(1) 2-amino-2-methyl-1-propanol (E) Hydroxy acids and their anhydrides
(1) caprolactone (F) Divalent or polyvalent inorganic salts of:
(1) magnesium
(2) calcium
(3) chromium (G) Polyisocyanates
(1) tolylene diisocyanate Other materials such as chelating agents, mercaptans, sulfide and thio compounds may also be utilized. In short, any compound or groups of compounds which can bridge two carboxyl groups is a potential means of forming and/or cross-linking polymer systems contemplated by the invention.

The materials of the invention also contain secondary amino hydrogen atoms which may be used solely or with a carboxylic group in either polymer formation or as a cross-linking site which reactions are also within the scope of the invention.

The polymeric materials of the present invention can also be blended with other polymeric materials which, due to their functionality may act as cross-linking agents. Within this class of materials are epoxy functional resinous materials such as the reaction products of epichlorohydrin and 2,2'-bis-(p-hydroxyphenylpropane) having average molecular weights in the range of 390 to 6700; polyester resins having both hydroxyl and carboxyl functionality such as the reaction product of phthalic anhydride, glycol and glycerol as well as oil-modified derivatives thereof; polymethylol resins such as urea-formaldehyde, melamine-formaldehyde and polymethylol acrylamide resins, etc.

The polymeric materials of the present invention exhibit improved fire resistant properties due to the formation of polymeric materials having numerous inorganic bonds, e.g., boron to nitrogen, rather than the usual carbon to carbon linkages. Due to the numerous inorganic bonds in the polymer, and especially where cyclic structures as in Compound IV are used, the materials of the invention are capable of withstanding temperature in the range of from 5000 to 6000° F. for several minutes. This property makes the materials of the invention highly useful as protective coatings against high temperature damage in such areas as rocket engines, missiles, jet turbine engines, etc. The materials of the invention are also useful in other areas where high temperature may be a problem and where temperature resistance is the desired quality of the coating such as industrial heating systems and the like. The capacity for solvent solubility enables easy application to large surfaces as by brushing, spraying, roller coating, etc.

The polymeric materials of the invention are also useful in formulating ablation coating materials. Ablation is the utilization of physical or chemical changes within the coating material to control heat by absorption. The physical changes which effect temperature control are chiefly accomplished by absorption of heat during sublimation of part of the coating. Also, the energy requirements associated with melting, vaporization and crystallization play an important role. As such, these energies are independent of the total amount of heat energy applied to a given system, the heat energy input determining only the amount of material usage. The rate of heat input determines the rate of sublimation, the temperature of the coated substrate remaining constant at the temperature of sublimation until all the subliming material has been consumed.

Chemical change within the coating can also provide useful areas of heat absorption. Such changes may be illustrated by decomposition to various intermediates, endothermic properties of bond cleavage, and the formation of unstable compound intermediates eventually leading to a gaseous evolution.

The main problem of any ablation coating system is to provide a matrix which maintains the ablative material in position on the substrate for a period of time sufficient to allow the absorption of a maximum amount of energy.

The materials of the invention are especially adapted to the formulation of ablation materials in that they are capable of providing a matrix which can withstand extreme temperature conditions without undue deterioration. In these formulations, the materials of the invention are blended or partially heat reacted with other materials which, upon exposure to high temperature, ablate from the coating carrying away quantities of heat to prevent excessive temperature which may injure the substrate being protected.

Since varied properties can be obtained in an ablation coating depending on whether materials capable of physical or chemical changes of state or both are employed, the design of an ablative system is subject to wide variation depending upon the rigors of the environment and the temperature and time during which protection is required. Thus, the choice of ablative materials and their proportion of use will vary widely depending upon the requirements of the task to be performed.

Various organic resinous materials are preferred in this regard, the preferred materials being those which are compatible or at least colloidally dispersible in the materials of the invention so that a uniform coating can be obtained allowing uniform ablation and temperature control and leaving on the substrate a uniform protective lattice or matrix of the heat-resistant materials of the invention.

Various classes of organic resinous materials may be mentioned as illustrative of usable materials such as polyester resins, alkyd resins, polyepoxide resins, etc. The choice of one material over another depends solely upon the physical and ablative properties desired to be obtained in the final coating.

While it is preferred to use the materials of the present invention as the sole heat resistant constituent, nevertheless, these materials may be blended or coreacted with other heat resistant materials as, for example, the materials disclosed in my copending application Ser. No. 66,916, filed Nov. 3, 1960, now U.S. Patent 3,238,181. Again, the use of such materials is dictated solely by the properties desired in the final coating system.

The polymeric materials of the present invention may also be formulated into foamed compositions by many techniques known to the art to provide heat resistant foams which are useful as insulation in high temperature environments. Various other uses will be evident to those skilled in the art based upon the exceptional heat resistance which is taught herein.

The invention is illustrated in the examples which follow. In the examples all parts are by weight unless otherwise stated.

Example 1

Compound I is produced by mixing 1580 parts of caprolactam and 865 parts of boric acid (1:1 molar ratio) in a reaction vessel equipped with an agitator, thermometer, inert gas inlet and reflux condenser fitted with a Dean-Stark receiver. After establishing a light inert gas blanket within the vessel, the temperature is raised to 200° F. and held for 15 minutes to complete formation of Compound I. By heating the above obtained product to 400° F. and holding until the desired viscosity is attained, a polymer containing Compound IV is produced.

Example 2

Compound II is produced by repeating Example 1 using 452 parts of caprolactam to 124 parts of boric acid (2:1 molar ratio of lactam to boric acid). By heating the above obtained product to 400° F. and holding until the desired viscosity is attained, a polymer containing Compound V is produced.

Example 3

Compound III is produced by repeating the method of Example 1 using 1356 parts of caprolactam and 248 parts of boric acid (3:1 molar ratio of lactam to boric acid) and holding at 200° F. for 30 minutes instead of 15 minutes.

Example 4

In this example, Compounds I, II, and III are produced in situ and are subsequently reacted with one another to form a polymeric material. 565 parts of caprolactam and 124 parts of boric acid (5:2 molar ratio) are charged into a reaction vessel equipped with an agitator, thermometer, inert gas inlet and a reflux condenser fitted with a Dean-Stark receiver. After establishing a light inert gas blanket, the vessel is gradually heated to 400° F. over a one-hour period and held for 30 to 45 minutes at that temperature. An inert gas sparge is introduced into the reaction vessel at 300° F. and the vessel is maintained at temperature until no further water is collected in the Dean-Stark receiver (approximately 36 grams total), which indicates completion of the reaction.

Example 5

The polymer of Example 4 upon cooling to 180° F. is blended with 650 parts of substantially pure diglycidal ether of Bisphenol A [2,2'-bis-(para-hydroxyphenolpropane)] and 150 parts of polyimide resin produced in accordance with my copending application, Ser. No. 66,916, now U.S. Patent 3,238,181, to form an ablation coating material. If desired, this ablation material may be pigmented, preferably using as the pigment an inorganic ablating material. Upon subjecting this material coated on an appropriate base to extreme temperature conditions, internal cross linking and vaporization of the resin components occurs, each absorbing heat energy from the coating thereby preventing heat buildup. During these reactions, a boric acid lactam resin of the present invention forms a porous matrix or insulating barrier which can withstand temperatures up to 6000° F.

Example 6

An ablation material is formed by mixing:

35 parts of the reaction products of Example 4;
21 parts of substantially pure diglycidal ether of Bisphenol A [2,2'-bis-(para-hydroxyphenolpropane)]; and
14 parts diglycidyl ether of 1,4-butane diol and pigmenting the same with:

| | Parts |
|---|---|
| Zirconium oxide (calcium stabilized) | 13 |
| Lampblack | 20 |
| and | |
| Asbestos floats | 15 |

The above formed ablation material is mixed with 7.1 parts of 2,4,6-tri(dimethylaminomethyl) phenol and air dried for 24 hours to form a slab of 100 mil thickness. One face of the slab was exposed to 2000° F. and the temperature of the unexposed face (the cool face) was measured during the exposure with the following results:

| Exposure time: | Temperature of cool face, ° F. |
|---|---|
| 68 sec. | 300 |
| 184 sec. | 400 |
| 325 sec. | 450 |
| 409 sec. | 500 |
| 15 mins. | 545 |

Another portion of this panel withstood 5500° F. for 12 minutes.

The invention is defined in the claims which follow.

I claim:

1. A resin soluble in organic solvent and formed by reacting boric acid with at least 0.7 mol of lactam per mol of said acid, said reaction being conducted in the liquid phase at a reaction temperature above room temperature to cause the production of an addition product of said lactam with said boric acid, and then causing said addition product to undergo a condensation reaction with itself or with additional lactam by heating at a higher temperature of at least about 400° F. to cause the removal of water.

2. Resin as recited in claim 1 in which the molar ratio of said lactam to said acid is about 1:1.

3. Resin as recited in claim 1 in which the molar ratio of said lactam to said acid is about 2:1.

4. Resin as recited in claim 1 in which the molar ratio of said lactam to said acid is about 3:1.

5. Resin as recited in claim 1 in which said lactam has the formula:

wherein R is an alkylene radical having at least two carbon atoms and R' is hydrogen.

6. Resin as recited in claim 1 in which said lactam is caprolactam.

7. Resin as recited in claim 1 in which said resin has repeating units having the formula:

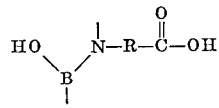

wherein R is a divalent hydrocarbon radical of at least two carbon atoms.

8. A resin as recited in claim 1 in admixture with polyfunctional material selected from the group consisting of polyhydric alcohols, epoxides, primary diamines, amino alcohols, hydroxy acids and their anhydrides, divalent or polyvalent inorganic salts and polyisocyanates.

9. A method of producing an organic solvent-soluble resin comprising reacting boric acid with at least 0.7 mol of lactam per mol of said acid, said reaction being conducted in the liquid phase at a reaction temperature above room temperature to cause the production of an addition product of said lactam with said boric acid, and causing said addition product to undergo a condensation reaction with itself or with additional lactam by heating at a higher temperature of at least about 400° F. to cause the removal of water.

References Cited

UNITED STATES PATENTS 2,352,796   7/1944   McLeod _____ 260—2

OTHER REFERENCES

The Naming and Indexing of Chemical Compounds, from Chemical Abstracts, vol. 56, January 1962, page 46.

WILLIAM H. SHORT, *Primary Examiner.*

H. D. ANDERSON, *Assistant Examiner.*

U.S. Cl. X.R.

117—161; 260—2, 2.5, 37, 47, 75, 78, 849, 857, 860

UNITED STATES PATENT OFFICE
CERTIFICATE OF CORRECTION

Patent No. 3,426,096  February 4, 1969

Bryce P. Anderson

It is certified that error appears in the above identified patent and that said Letters Patent are hereby corrected as shown below:

In the heading to the printed specification, lines 5 and 6, "DeSoto Chemical Coatings" should read -- DeSoto --. Column 2, line 49, "Through" should read -- Though --; line 54, "materials" should read -- material --. Column 3, line 51, before "lactam" insert -- a --. Column 4, line 8, before "monofunctional" insert -- the --. Column 7, line 59, cancel "as", first occurrence. Column 8, line 25, "carboxylic" should read -- carboxyl --.

Signed and sealed this 31st day of March 1970.

(SEAL)
Attest:

Edward M. Fletcher, Jr.
Attesting Officer

WILLIAM E. SCHUYLER, JR.
Commissioner of Patents